Patented Apr. 18, 1944

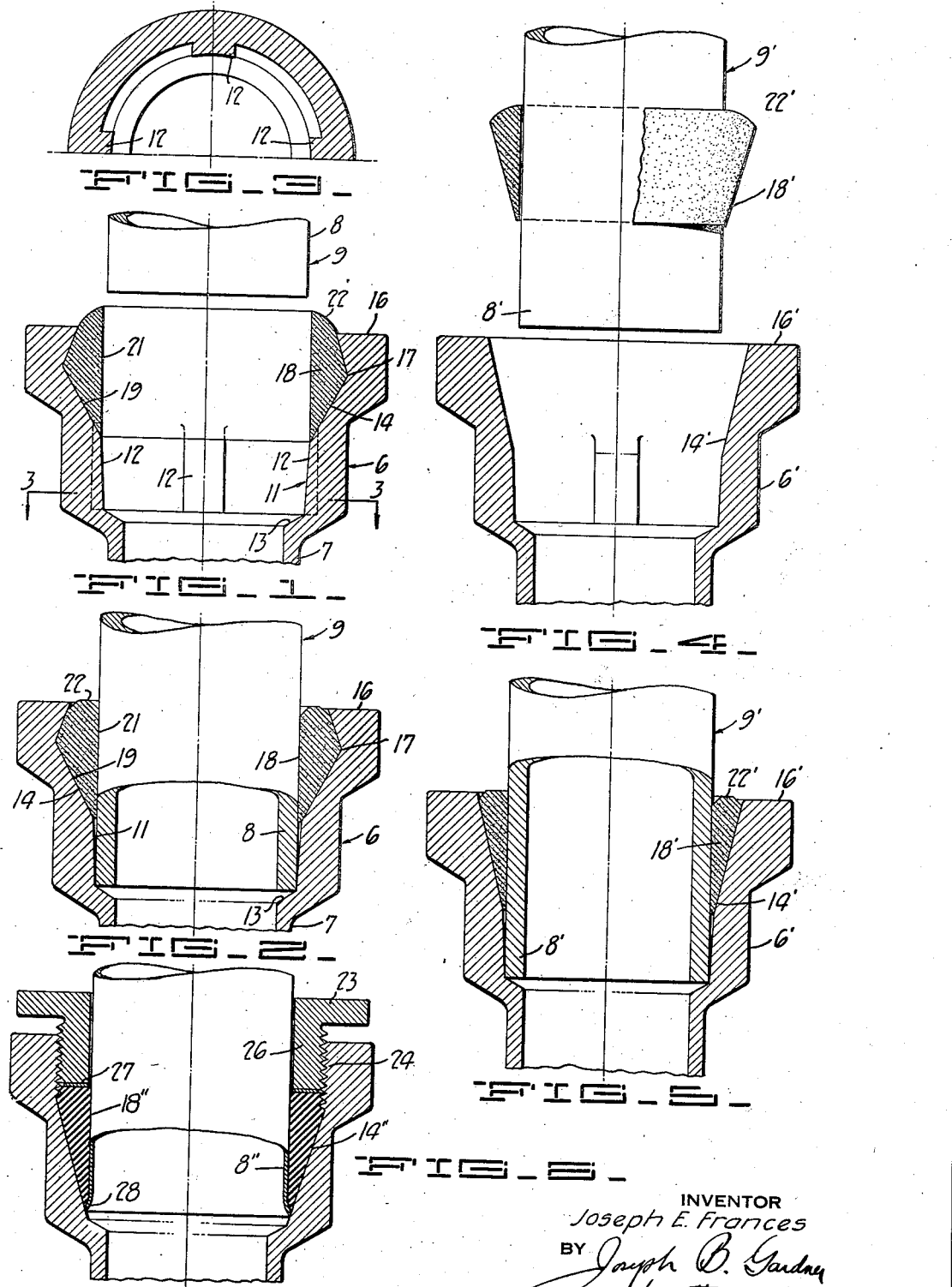

2,347,044

UNITED STATES PATENT OFFICE 2,347,044

PIPE BELL HUB AND SEALING MEANS

Joseph E. Frances, Oakland, Calif.

Application October 10, 1941, Serial No. 414,493

4 Claims. (Cl. 285—115)

The invention relates to pipe fittings and more particularly to the means of sealing a pipe end in a pipe bell hub.

The present invention has been developed especially for use in the durham or threaded type of drainage system utilizing wrought iron, steel, copper or brass pipe which heretofore has been threaded at the ends of the pipe sections for receipt in threaded bell hubs on various types of fittings such as elbows, Y's, etc. An object of the present invention is to provide an improved type of pipe joint wherein the use of threads is completely eliminated and wherein a pre-formed gasket is substituted which is designed to be compressed into the bell hub around the pipe end to be sealed, thereby providing a joining of the several pipe sections and fittings without requiring the matching of threads, turning of the several parts with respect to each other to effect the connection, and the other disadvantages attendant upon the requirement for threading the several parts together. In accordance with the present invention and as a principal feature thereof, the parts to be joined may be merely longitudinally inserted one within the other without turning and the gasket aforesaid compressed to effect a permanent and efficient seal between the parts, whereby a great saving in labor is obtained.

Another object of the invention is to provide a new and improved form of bell hub.

The invention possess other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of a pipe joint sealing means constructed in accordance with the present invention and shown with the pipe sections in detached position.

Figure 2 is a sectional view similar to Figure 1 but showing the pipe sections in attached position.

Figure 3 is a cross-sectional view showing a part of the bell hub and is taken substantially on the plane of line 3—3 of Figure 1.

Figure 4 is a longitudinal sectional view of a modified form of construction showing the pipe sections in detached position.

Figure 5 is a longitudinal sectional view of the form of the invention illustrated in Figure 4 but with the pipe sections in attached position.

Figure 6 is a longitudinal sectional view of another modified form of the invention.

The pipe bell hub and sealing means of the present invention consists briefly in the combination of a bell hub having a base portion formed to provide a substantially cylindrical embrace of a pipe inserted therein for sealing in the hub and an internal wall diverging outwardly from the base adapted for support of a pre-formed tubular gasket member of compressible material having a tapered conical external wall fitting the tapered internal wall of the bell hub and having an axial bore embracing the pipe end whereby upon compression of the gasket member from the open end of the bell hub, the pipe end will be tightly sealed within the bell hub.

With reference more specifically to the accompanying drawing and with particular reference to Figures 1 to 3, the bell hub 6 of the present invention is shown as a part of a pipe section or fitting 7 and is adapted to telescopically receive the cylindrical end portion 8 of a pipe section 9 to be sealed in the bell hub. The interior of the bell hub is provided with a base portion 11 formed to provide a substantially cylindrical embrace of the inner end 8 of the pipe section 9 and preferably a taper is provided in the base portion in order to obtain a tight wedged engagement of the end 8 in the base when the former is pressed home in the bell hub. Desirably, however, the taper is relatively slight so that a substantial area of contact is obtained between the base portion and the pipe end to support the pipe against undue rocking in the bell hub. Preferably and as here shown, the cylindrical embrace provided by the base portion of the bell hub is effected by means of a plurality of elongated axially extending ribs or rails 12 which, as will be seen in Figure 3, are preferably spaced uniformly around the circumference of the base in concentric relation to the axis of the bell hub. The longitudinal surfaces of these ribs are slightly inclined to the axis in the direction of insertion of the pipe end, that is towards the bottom of the bell hub, so as to provide the tapered embrace of the pipe end as aforementioned. A shoulder or offset 13 is desirably provided at the bottom of the bell hub to limit the amount of insertion of the pipe end into the bell hub although, as will be understood, the wedged engagement of the rails and pipe end will in some instances prevent the full insertion of the pipe end to the shoulder 13, it being sufficient for present purposes if the pipe end is inserted longitudinally into the base portion by a sufficient distance to firmly and securely hold the pipe concentric in the bell hub against undue rocking of the pipe. Usually where a pipe section is cut to length, on the job, a slight burr is left around the cut end of the pipe and the use of the ribs or rails 12 instead of a full circular wall of engagement, reduces the bearing friction on insertion to permit ready insertion of pipes having such a burr. Preferably at least three ribs are used and this number may be increased as desired, particularly with larger sizes of bell hubs.

As a second important feature of the bell hub construction, the interior wall 14 of the bell hub lying outwardly of the base portion 11 tapers divergently from such base portion to adjacent the outer open end 16 of the bell hub, an annular recess 17 being here provided in the wall adjacent the outer end 16 interrupting the outward flare of the inner wall 14. This conical wall portion 14 is particularly arranged to support a sealing gasket surrounding the pipe end and which upon compression into the space between the pipe and the tapered wall will be uniformly concentrically driven against the pipe to seal the latter in the bell hub and to in addition provide a rigid lateral support for the pipe adjacent the outer end of the bell hub coacting with the base portion as aforementioned to afford a rigid support for the pipe in the bell hub.

The sealing means of the present invention consists of a pre-formed sealing gasket 18 of compressible material and which is of tubular conical form having a tapered external wall 19 conforming to and fitting against the internal wall 14 of the bell hub and having a cylindrical internal wall 21 of substantially the same diameter as the outside diameter of the pipe section 9 to be sealed, whereby the wall 21 will snugly slidably embrace the periphery of the inserted pipe end 8. In the form of the invention illustrated in Figures 1 to 3, the gasket 18 is preferably formed of lead and is cast within the bell hub so that the outer wall 19 of the gasket will conform exactly to the inner wall 14 of the bell hub and interlock with the recess 17 to prevent withdrawal of the gasket. In casting the gasket in the bell hub, a cylindrical core may be inserted as a form into the bell hub which upon removal will leave the cylindrical axial bore 21 through the interior of the gasket. If desired, the core may be formed to prevent the flow of lead into the base portion between the ribs 12.

In the form of the invention illustrated in Figures 1 to 3, the bell hub 6 and sealing gasket 18 are supplied as a single article of manufacture. On the job, the plumber merely needs to insert the pipe end 8 of section 9 to be joined by a distance securely holding the pipe section in the base portion of the bell hub, and then caulk the outer end 22 of the gasket 18 with a suitable hammering, caulking iron to thereby compress the gasket tightly around the inserted pipe end. Preferably the outer end 22 of the gasket projects slightly from the open end 16 of the bell hub to facilitate caulking. As will be understood, the pounding of the outer end of the lead gasket, which forms the base of its conical section, causes the gasket material to flow or drift towards the base end of the bell hub, and by reason of the taper of the internal wall 14 of the bell hub, the lead is tightly compressed around the inserted pipe end.

A modified form of the invention has been illustrated in Figures 3, 4 and 5, wherein a conical tubular lead sealing gasket 18' similar to that shown in the first construction is supplied to the trade as an article of manufacture separate from the bell hub 6' or pipe section 9'. In this form of the invention a bell hub is used without a locking recess, such as recess 17 in the principal embodiment, and the interior wall 14' of the bell hub tapers uniformly to the outer end 16', of the bell hub. Otherwise the bell hub is formed substantially the same as in the first embodiment. In this form of the invention the gasket 18' is merely slid over the inserted end 8' of the pipe section 9' and then inserted into the bell hub together with the end 8'. After insertion, the lead gasket is caulked from its outer end 22' as in the first embodiment, so as to tightly embrace the pipe end 8' and entirely fill the space between such end and the interior wall 14' of the bell hub, the tapered wall 14' serving in this embodiment as in the first, to cause the inward flow of lead during caulking to exert a sealing pressure against the external wall of the pipe and the internal wall of the bell hub.

Another modified form of the invention has been illustrated in Figure 6, designed primarily for sheet metal tubing and wherein a tubular conical gasket 18'' of compressible material, similar to that used in the preceding embodiments, is mounted between the inserted end 8'' of the pipe or tube section and the tapered interior wall 14'' of the bell hub, but is compressed from the outer or open end of the bell hub by means of a jam nut 23 rather than by caulking as in the previous embodiments. In this form of the invention the gasket 18'' is preferably formed of a more compressible material than lead, preferably rubber or synthetic substitutes therefor or the like. The outer end portion 24 of the interior wall of the bell hub is cylindrical in form and threaded to receive the exteriorly threaded annulus portion 26 of the jam nut projecting into the space between the pipe and the wall 24. Preferably, a bearing ring 27 of steel or other metal is interposed between the opposing end faces of the jam nut and gasket to prevent undue twisting of the gasket in threading the jam nut home against the gasket. In this form of the invention it will also be seen that the compression of the gasket against the tapered interior wall of the bell hub tightly wedges the gasket against the exterior wall of the bell hub to effectively seal these parts together. Preferably the extreme end 28 of the pipe section is flared, as by the use of a suitable swaging tool, to lock into the gasket when the latter is compressed and prevent withdrawal of the tube. In view of such anchoring of the tube end, the cylindrical embrace provided by the ribs 12 in the first embodiment may be dispensed with and the tapered wall 14'' continued to the bottom of the bell hub.

I claim:

1. A pipe bell hub having a base portion formed to provide a circumferential embrace of a pipe inserted therein for sealing in said hub, said base portion being tapered to converge in the direction of insertion of said pipe to provide a wedged engagement with the pipe the internal wall of said hub diverging outwardly from said base portion to provide a tapered wall part of greater angularity with the hub axis than said first taper, said internal wall part being formed with an annular recess adjacent the open end of said hub, and a sealing gasket of compressible material fitting in and interlocked with said recess and having a tapered outer wall conforming to said tapered wall part and provided with an internal substantially cylindrical wall of greater diameter than the pipe and being adapted to slidably embrace said pipe.

2. A pipe bell hub having a socket with an outer portion and a base portion formed with a plurality of circumferentially spaced longitudinally extending ribs terminating inwardly of said outer portion and provided with surfaces adapted to slidably embrace a pipe inserted therein, the longitudinal embracing surfaces of said ribs being inclined towards the axis of said hub in the direction of insertion of said pipe to provide a wedged engagement with said pipe, said outer portion having a wall inclined at a greater angle to said axis than said pipe engaging surfaces and adapted to support a sealing gasket around said pipe.

3. A pipe bell hub having a base portion formed to provide a circumferential embrace of a pipe inserted therein for sealing in said hub, said base portion being tapered to converge in the direction of insertion of said pipe to provide a wedged engagement with the pipe, the internal wall of said hub diverging outwardly from said base portion to provide a tapered wall part of greater angularity with the hub axis than said first taper, and a sealing gasket of compressible material having a tapered wall conforming generally to said tapered wall part of said hub and having an internal substantially cylindrical wall of greater diameter than the pipe and being adapted to slidably embrace said pipe.

4. A pipe bell hub having a socket with an outer portion and a base portion formed with a plurality of circumferentially spaced longitudinally extending ribs terminating inwardly of said outer portion and provided with surfaces adapted to slidably embrace a pipe inserted therein, the longitudinal embracing surfaces of said ribs being inclined towards the axis of said hub in the direction of insertion of said pipe to provide a wedged engagement with said pipe, said outer portion having a wall inclined at a greater angle to said axis than said pipe engaging surfaces, said outer wall portion having an annular recess adjacent to the open end of said hub, and a sealing gasket of compressible material fitting in and interlocked with said recess and having a tapered outer wall conforming to said outer portion.

JOSEPH E. FRANCES.